US008167030B2

(12) United States Patent
Kolb et al.

(10) Patent No.: US 8,167,030 B2
(45) Date of Patent: May 1, 2012

(54) MICRO-EVAPORATOR (76) Inventors: Gunther Kolb, Neustadt (DE); David Tiemann, Gau-odernheim (DE)

( * ) Notice: Subject to any disclaimer, the term of this patent is extended or adjusted under 35 U.S.C. 154(b) by 1058 days.

(21) Appl. No.: 11/918,172

(22) PCT Filed: Apr. 6, 2006

(86) PCT No.: PCT/EP2006/061393
§ 371 (c)(1),
(2), (4) Date: Jan. 2, 2008

(87) PCT Pub. No.: WO2006/108796
PCT Pub. Date: Oct. 19, 2006

(65) Prior Publication Data
US 2008/0307825 A1 Dec. 18, 2008

(30) Foreign Application Priority Data
Apr. 15, 2005 (DE) .......................... 10 2005 017 452

(51) Int. Cl.
F28F 3/14 (2006.01)
F28F 7/00 (2006.01)
(52) U.S. Cl. ...................................... 165/170; 165/80.4
(58) Field of Classification Search .................. 165/166, 165/167, 168, 170, 146, 147, 104.21, 80.4
See application file for complete search history.

(56) References Cited

U.S. PATENT DOCUMENTS

| 2,872,165 A * | 2/1959 | Wennerberg ................. 165/147 |
| 3,817,321 A | 6/1974 | von Cube et al. |
| 4,586,565 A * | 5/1986 | Hallstrom et al. ............. 165/167 |
| 4,765,397 A * | 8/1988 | Chrysler et al. .......... 165/104.33 |
| 4,884,630 A * | 12/1989 | Nelson et al. .................. 165/170 |
| 5,002,123 A * | 3/1991 | Nelson et al. .................. 165/147 |
| 6,126,723 A | 10/2000 | Drost et al. |
| 6,152,216 A * | 11/2000 | Schwab et al. ................. 165/167 |
| 6,220,497 B1 * | 4/2001 | Benz et al. ..................... 228/118 |
| 6,389,696 B1 * | 5/2002 | Heil et al. ................. 29/890.039 |
| 7,017,612 B2 | 3/2006 | Ott |
| 2003/0104170 A1 * | 6/2003 | Johnston et al. .............. 428/167 |
| 2006/0231233 A1 * | 10/2006 | Farid et al. ...................... 165/10 |

FOREIGN PATENT DOCUMENTS

| DE | 199 63 594 A1 | 7/2001 |
| DE | 100 10 400 C2 | 9/2001 |
| DE | 103 13 695 A1 | 10/2004 |
| EP | 1 148 772 A2 | 10/2001 |
| JP | 2004275807 A * | 10/2004 |

OTHER PUBLICATIONS

T.A. Ameel et al; "Miniaturization Technologies Applied to Energy Systems"; Energy Convers. Mgmt vol. 38, No. 10-13, pp. 969-982, 1997.
Ashish V. Pattekar et al; "A Radial Microfluidic Fuel Processor"; Journal of Power Sources 147 (2005) 116-127.
Wilhelm R. A. Vauck et al; "Grundoperationen chemischer Verfahrenstechnik"; 10., durchges Aufl.—Leipzig, Stuttgart: Dt. Verl. Für Grundstoffindustrie, 1994; ISBN 3-342-0069-3; pp. 5 and 508-509.

* cited by examiner

*Primary Examiner* — Tho V Duong
(74) *Attorney, Agent, or Firm* — Flaster/Greenberg PC (57) ABSTRACT

A micro-evaporator is disclosed which is easy to manipulate and can be operated problem-free over a large temperature range. The micro-evaporator has micro-evaporator channels in a trapezoidal region, comprising an inlet region opening in the liquid feed chamber with a small diameter, and an outlet region opening into the vapor collecting chamber with a large diameter.

15 Claims, 7 Drawing Sheets

MICRO-EVAPORATOR

BACKGROUND OF THE INVENTION

1. Field of the Invention

The invention relates to a micro-evaporator according to the preamble of claim 1

2. Description of Related Art

Micro-evaporators are used to evaporate liquid media such as water, alcohols or alcohol/water mixtures, liquid gases or liquid alkanes for further processing. Such micro-evaporators are for example used in the fields of fuel cell engineering.

Different designs of evaporators are known. So-called plate heat exchangers consist of corrugated steel plates provided with channels for transferring the liquid like filter presses. Resistant rubber seals hold the plates at a distance from each other and seal the channels of the two fluids from each other. Due to the rubber seals, the plate heat exchangers are restricted to a maximum temperature of 250° C. The two fluids flow in a concurrent or a countercurrent flow as thin layers alternating up or down through a series of chambers and contact each other on both chamber walls. Corrugated plate profiles increase turbulence and improve the transfer of heat. Such evaporators are not compact and, when they are operated with heating gas, they have low power densities. Such plate heat transfer systems are for example known from Vauck/Muller; Grundoperationen der Verfahrenstechnik; Leipzig 1994.

An evaporator with micro-structured components for the partial or complete evaporation of liquids is for example known from U.S. Pat. No. 6,126,723. The reactor consists of two fluid chambers for a first and second fluid, and the fluid chambers are connected by means of plates that are porous or provided with micro-structured holes. The reactor is intended for transferring a working fluid contained in a first liquid into a second fluid, and the plates provided with micro-structured holes are only permeable to the working fluid. This reactor can also be used as an evaporator.

Micro-structured devices for conducting media are known from DE 199 63 594 A1 and DE 100 10 400 C2. These devices are especially suitable for evaporating liquid media.

The device in DE 199 63 594 A1 has a layered structure, and at least one layer possesses a number of micro-channels through which the medium to be evaporated flows. A second layer also has a number of micro-channels through which a heat-transferring medium flows. The micro-channels each have an inlet and outlet. To satisfactorily evaporate the liquid medium, the outlets of the micro-channels have a smaller area for the medium to be evaporated and/or have a different geometrical structure than the respective inlets. The pressure of the liquid medium is thereby increased in the micro-channels so that overheated, still-liquid medium suddenly transitions from a liquid to a vapor after leaving the smaller area outlets.

According to DE 100 10 400 C2, the heat output of the heating device is adjustable at least in areas independent of other areas to adjust a desired temperature profile on the surface of the flow channels, at least in individual areas of the flow channels in the direction of flow.

According to this state-of-the-art, the micro-channels for guiding the liquid to be evaporated are parallel. The disadvantage of this micro-evaporator is that the vapor bursts or vapor bubbles can arise if the optimum temperature range is not adjusted. The optimum operating point must be maintained which requires several parameters to be harmonized such as the flow speed and pressure of the medium to be evaporated, the heat output, etc. Such micro-evaporators therefore malfunction easily and cannot be flexibly used.

The problem of the invention is to provide a micro-evaporator that is easier to handle and can be operated problem-free over a wider temperature range

BRIEF SUMMARY OF THE INVENTION

This problem is solved with a micro-evaporator where the micro-evaporator channels are in a trapezoidal area having an inlet area with a smaller cross-section ending in the feed chamber, and an outlet area with a larger cross-section ending in the vapor collection chamber.

By arranging the micro-evaporator channels in a trapezoidal area, the inlets of the micro-channels lie directly next to each other. The width of segments separating the micro-evaporator channels can become 0 at the inlet area of the trapezoidal area. The liquid in the feed chamber is therefore discharged very quickly which effectively prevents premature evaporation in the feed chamber.

The outlet area of the trapezoidal area is larger than the inlet area with the advantage that the outlets of the micro-channels are clearly spaced which allows the (overheated) vapor whose volume is very much more than that of the initial liquid to exit unrestricted into the corresponding large-volume vapor collection chamber. This prevents overpressure at the outlet area and keeps the liquid columns from being pressed back in the micro-channels opposite the direction of flow which enhances problem-free operation.

It has been demonstrated that the micro-evaporator can operate smoothly over a wide temperature range of 100 to 500° C. for water. The micro-evaporator is insensitive to parameter changes, and a change in the mass flow of the medium to be evaporated is not problematic at a given heating temperature.

Another advantage of the micro-evaporator is that it can be positioned independently in use.

The substantial compactness and the high energy density are additional advantages. In addition, the system can be operated free of carrier gas. The system can be heated with heating gas whose temperature can lie several hundred degrees centigrade above the boiling temperature of the liquid to be evaporated. Furthermore, a chemical reaction can be used for heating whose reaction temperature can lie several hundred degrees centigrade above the boiling temperature of the liquid to be evaporated. The liquid can also be evaporated at heating temperatures that are slightly above the evaporation temperature of the medium to be evaporated, which is advantageous in regard to energy consumption.

The micro-evaporator can be operated within a variable pressure range of the liquid to be evaporated.

The micro-evaporator channels are preferably located in the trapezoidal area in a fan-like arrangement. This means that the micro-evaporation channels lead radially from the liquid feed chamber and enter the vapor collection chamber at a marked distance from each other.

The micro-evaporator channels preferably have a cross-section of $100 \,\mu m^2$ to $0.01 \, mm^2$. The cross-sectional areas are more preferably $100 \,\mu m^2$ to $0.005 \, mm^2$ and $100 \,\mu m^2$ to $0.0025 \,\mu m^2$. Rectangular micro-evaporator channels have corresponding edge lengths of $10 \,\mu m$ to $100 \,\mu m$, or a especially range from $10 \,\mu m$ to $50 \,\mu m$. Due to the small dimensions of the micro-evaporator channels, the contact surface/volume ratio is very high, and a high transfer of heat is achieved that causes the liquid to quickly evaporate. These small dimensions of the micro-evaporator channels, especially in the area where the liquid/gas transition occurs, prevent boiling delays which enables the liquid to evenly evaporate.

The micro-evaporator channels preferably have a constant cross-section over their entire length. The micro-evaporator channels can for example be produced by electrical discharge machining, molding, laser ablation or other processing methods.

The micro-evaporator channels can run in a straight line or meander. The advantage of meandering or wave-shaped micro-evaporator channels is the greater contact between the liquid to be evaporated and the channel wall while the liquid is flowing due to the curves in the channel. This substantially improves the transfer of heat. Another advantage of the meandering arrangement and design of the micro-evaporator channels is that, despite the greater length of the micro-evaporator channels, the design can be more compact.

In another embodiment, the micro-evaporator channels have sections with larger and smaller cross-sections that alternate sequentially. This embodiment of the micro-evaporator channels also has the advantage of greater heat transfer from the increased contact of the liquid due to the necessary diversion in the micro-evaporator channels.

In these embodiments of the micro-evaporator channels, the distance between the micro-evaporator channels increases toward the vapor collection chamber.

An alternate embodiment provides that each micro-evaporator channel consists of offset, sequential channel sections. In a development of this embodiment, the adjacent channel sections can be connected with each other. Consequently, the volume available for the vapor in the area of the micro-evaporator channels increases toward the vapor collection chamber. This takes into account the increased volume of the vapor and helps the (overheated) vapor to be quickly discharged into the vapor collection chamber.

The vapor collection chamber preferably has a larger volume than the liquid feed chamber.

The means to heat the liquid to be evaporated are preferably located at least in the area above and/or below the micro-evaporator channels. By means of this arrangement, the area to be heated can be preferably concentrated on the area where the micro-evaporator channels are located. Given the relatively fast discharge of the liquid to be evaporated out of the feed chamber into the micro-evaporator channels, the entire micro-evaporator does not necessarily have to be correspondingly heated.

The means for heating preferably comprise micro-structured heating channels, electrical heating cartridges or lamps such as quartz lamps. In this case, the heat is provided by radiation energy.

A preferred embodiment of the micro-evaporator is characterized by at least one evaporator plate, on the front side comprising the structure of the liquid supply chamber, the micro-evaporator channels and vapor collection chamber. The essential components can therefore be located in a plate which simplifies the production of the micro-evaporator and also allows for a modular design in which numerous such plates can be stacked, and the evaporation plates are only separated from each other by simple, preferably non-structured intermediate plates.

When the evaporator plate preferably has micro-structured heating channels in its back, it additionally contributes to the compact design and simplified production of the micro-evaporator.

The cross-sections of the heating channels preferably range from 0.1 mm to 10 mm.

The heating channels can be coated with a catalyst material. The heating in this instance can be provided by catalytic combustion.

The heating channels are preferably parallel, and preferably extend in the same direction as the micro-evaporator channels. This same alignment of the heating channels means that both the heating channels as well as the micro-evaporator channels extend essentially in the lengthwise direction of the plate. The heating channels can be operated in a concurrent flow or in a counter-current flow with reference to the direction of flow of the liquid to be evaporated. This depends on the heating liquid, the liquid to be evaporated and the required transfer of heat.

The residual wall thickness of the evaporator plate is preferably <1 mm. The advantage is that there is a good transfer of heat between the heating medium and the liquid to be evaporated.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. Exemplary embodiments of the invention are further explained below with reference to the drawings. The following are shown.

DETAILED DESCRIPTION OF THE INVENTION

Figure 1:
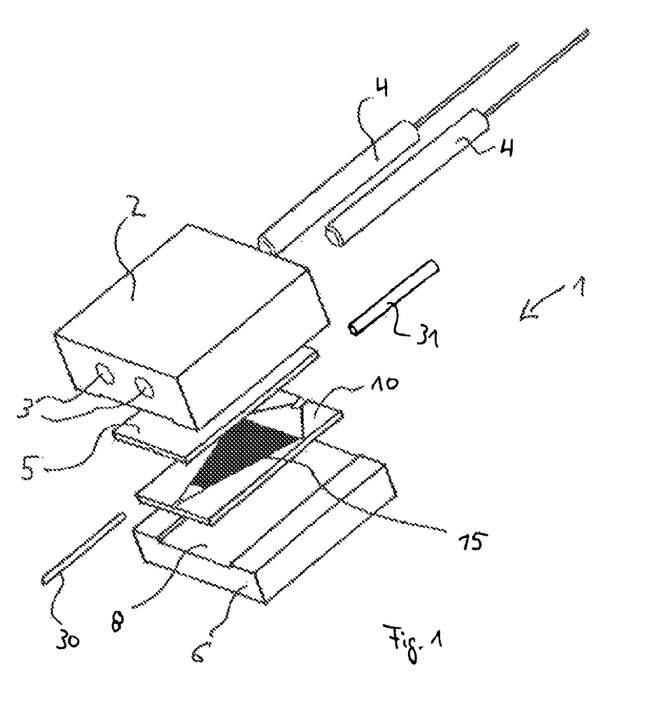
FIG. 1 an exploded view of a micro-evaporator in a first embodiment.

FIG. 1 shows a micro-evaporator 1 having (from top to bottom) a heating plate 2 with holes 3 to receive heating elements 4, a cover plate 5, a micro-evaporator plate 10 and a baseplate 6. The cover plate 5 lies on the micro-evaporator plate 10 that has the micro-structured micro-evaporator channels in a trapezoidal area 15 as explained in detail with reference to the subsequent Figures.

The micro-evaporator plate 10 where the liquid is evaporated is connected to a feed line 30 for the liquid to be evaporated and a discharge line 31 to remove the vapor. The micro-evaporator plate 10 is in a groove-like recess 8 of the base plate 6. Overall, this yields a cuboid micro-evaporator with outer dimensions less than 50 mm that is expandable with additional micro-evaporator plates 10 and inserted intermediate plates 7 as explained with reference to FIGS. 9*a* and 9*b*.

Figure 2:
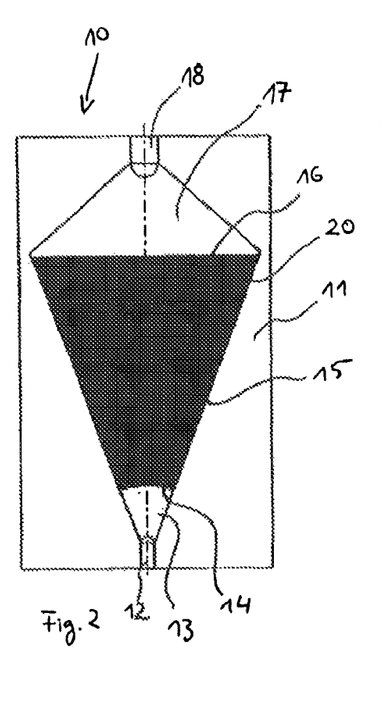
FIG. 2 a plan view of a micro-evaporator plate of the micro-evaporator shown in FIG. 1, FIG. 3 *a-c* enlarged sections from the plan view of the micro-evaporator shown in FIG. 2, FIG. 4-7 enlarged sections of a schematic representation of the micro-evaporator plate to illustrate different embodiments of the micro-evaporator channels, FIG. 8 a perspective view of the underside of an evaporator plate FIGS. 9*a* and *b* perspective plan and bottom views of a micro-evaporator in another embodiment, and FIG. 10 a schematic representation of an evaporator system using a micro-evaporator according to the invention.

FIG. 2 shows a plan view of the front side 11 of the micro-evaporator plate 10 shown in FIG. 1, said plate consisting of a highly-conductive material such as steel. An inlet 12 runs upward from the bottom and ends in a liquid feed chamber 13. The liquid feed chamber 13 expands in the direction of flow and has a curved end area which connects with the likewise curved inlet area 14 of the trapezoidal area 15 in which the micro-evaporator channels 20 are located that are best viewed in FIG. 3*a* to 3*c*.

The opposite end of the trapezoidal area 15 has an outlet area 16 that connects with the vapor collection chamber 17 which is provided with an outlet 18. The vapor collection chamber 17 also has a trapezoidal shape, and the vapor collection chamber 17 narrows from the outlet area 16 of the trapezoidal area 15 toward the outlet 18. The depth of all the microstructures is 30 µm.

Figure 3A:
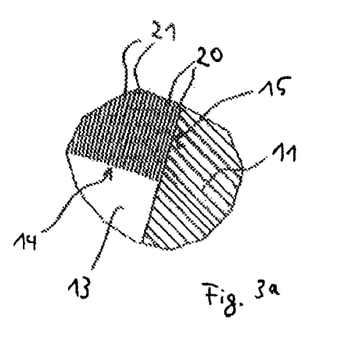

FIG. 3*a* shows an enlarged section of the inlet area 14 of the trapezoidal area 15. Numerous straight micro-evaporator channels 20 are separated from each other by a corresponding number of segments 21. The width of the segments 21 is minimal at the inlet area 14 so that the inlet openings of the micro-evaporator channels 20 lie directly next to each other to quickly intake the liquid in the feed chamber 13 and conduct it into the micro-evaporator channels 20.

The micro-evaporator channels 20 in this embodiment are fan-shaped so that the distance between the micro-evaporator channels 20 increases toward the vapor collection chamber 17 as a result of the corresponding widening of the segments 21. This can be seen by comparing FIGS. 3*a* and 3*c* that show a section of the middle area and outlet area 16 of the trapezoidal area 15. The cross-section of the micro-evaporator channels 20 remains the same over the entire length. The cross-section dimensions of the micro-evaporator channels 20 are 30 µm×30 µm. In this manner, several hundred evaporator channels (such as 200) can be arranged next to each other.

Figure 3B:
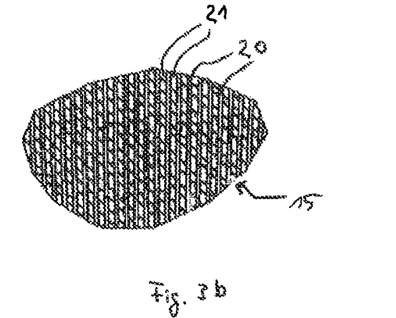
Figure 3C:
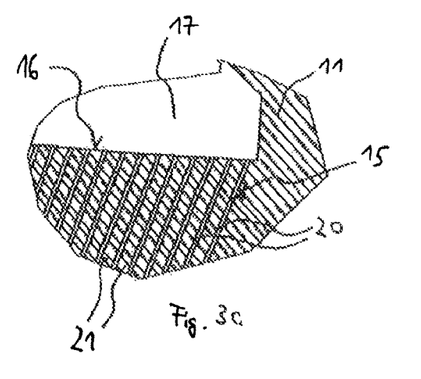
Figure 4:
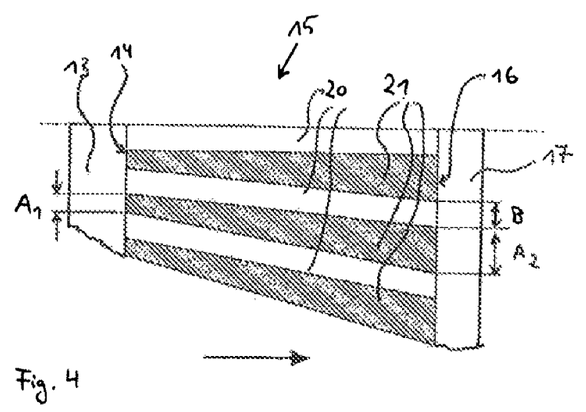

FIG. 4 again schematically illustrates the embodiment shown in FIG. 3*a* to 3*c*. We can see that the width B of the radiating or fan-shaped micro-evaporator channels 20 remains constant over their entire length in the trapezoidal area 15, whereas the width of the segments 21 separating the micro-evaporator channels 20 increases from width $A_1$ to width $A_2$ that can be a multiple of width B.

Figure 5:
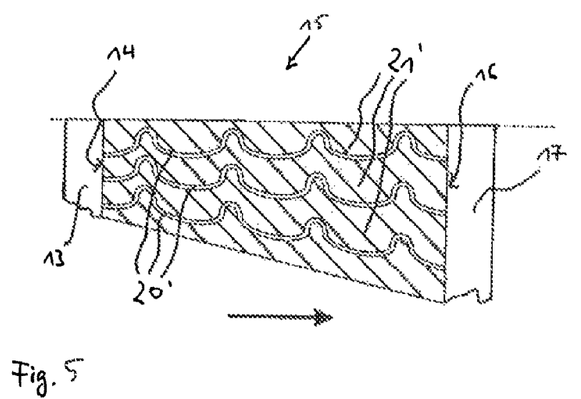

FIG. 5 schematically portrays another embodiment where the micro-evaporator channels 20' have a wave-shaped or meandering design. The liquid to be evaporated necessarily follows the curves of the meandering micro-evaporator channels 20' and is alternately pressed against the left and right side of the micro-evaporator channel walls due to the flow to improve the transfer of heat. At the same time, the construction is compact with a greater length of the micro-evaporator channels 20'. In this embodiment as well, the meandering micro-evaporator channels 20' are fan-shaped arising from the increased width of the likewise wave-shaped segments 21'.

Figure 6:
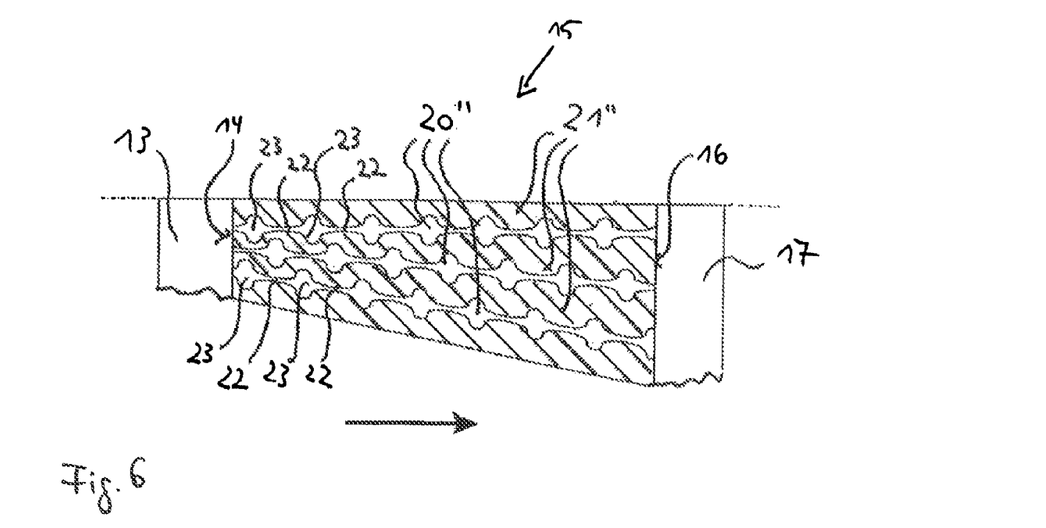

According to the embodiment shown in FIG. 6, the micro-evaporator channels 20" have channel sections 22 with a smaller diameter, and channel sections 23 with a larger diameter. This embodiment also increases the contact of the liquid to be evaporated with the channel walls due to the flow and thereby improves the transfer of heat. The individual channel sections 22, 23 of the neighboring micro-evaporative channels 20" are offset in relation to each other to save space. The design of the segments 21" follows this arrangement.

Figure 7:
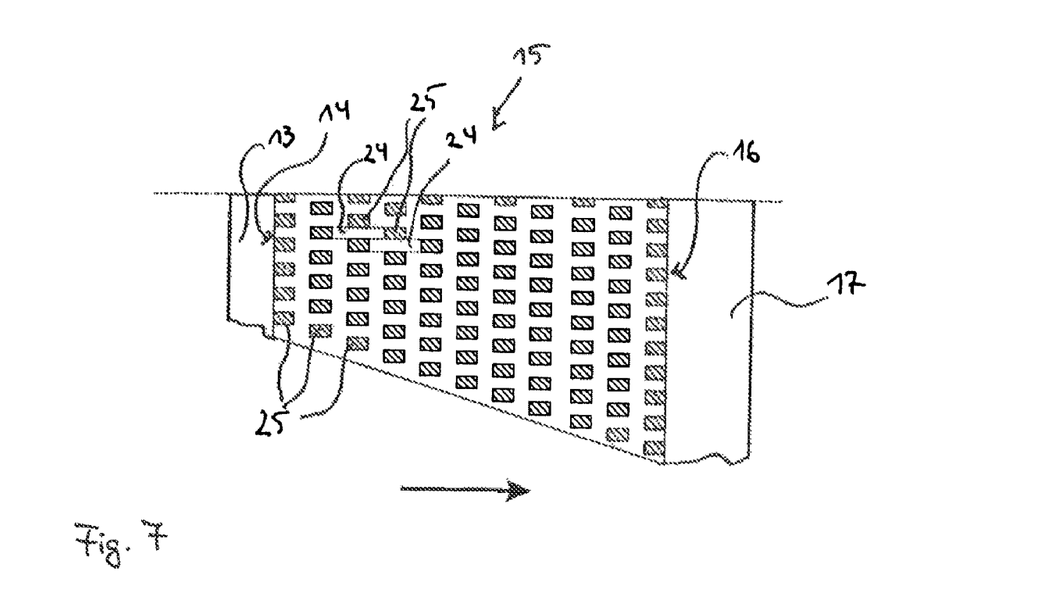

FIG. 7 shows another embodiment in which individual adjacent, offset, column-shaped segments 25 are sequentially arranged. The individual micro-channels are formed by the channel sections 24 where two channel sections are given dashed lines between two column-shaped segments 25 for clarity. We can clearly see that these channel sections 24 are also connected to the neighboring channel sections 24. The volume within the micro-evaporator channels thereby increases from the inlet area 14 to the outlet area 16 taking into account the expansion of the vapor in the trapezoidal area 15.

Figure 8:
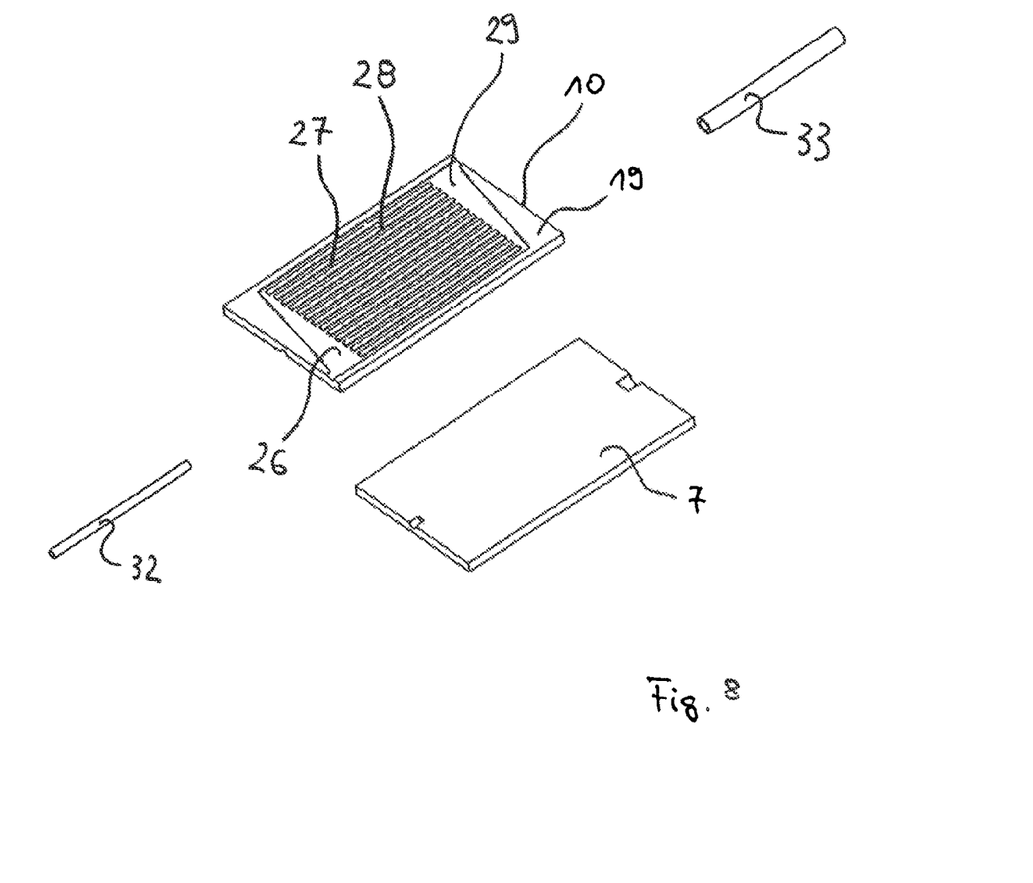

FIG. 8 shows an enlargement of the underside 19 of the micro-evaporator plate 10. The heating micro-channels 27 are also separated from each other with segments 28. An antechamber 26 and a post-chamber 29 are provided that are connected with each other by means of heating channels 27. These chambers 26, 29 serve to distribute and collect the heating gas that flows through the heating channels 27. In addition, FIG. 8 also shows the feed line 32 and the discharge line 33 for the heating gas as well as an intermediate plate 7 that is only structured in the area of the feed and discharge of the steam or liquid to be evaporated.

Figure 9A:
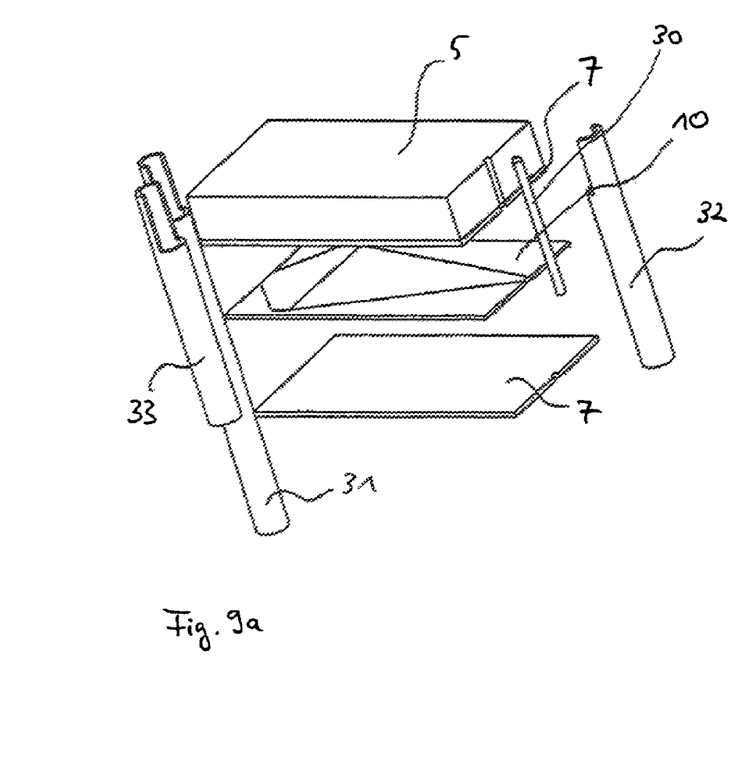
Figure 9B:
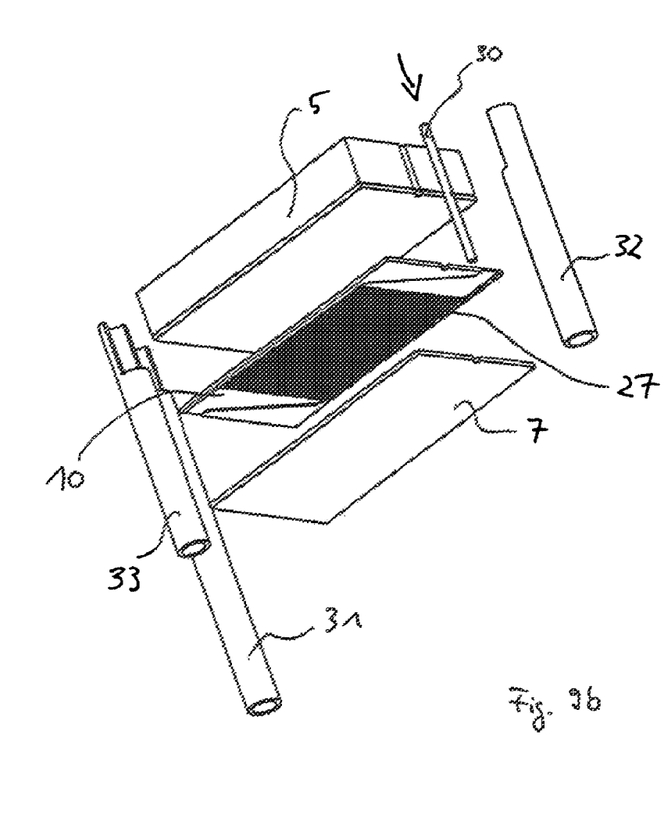

FIGS. 9*a* and *b* show another embodiment of the micro-evaporator with numerous evaporator plates 10 that are separated from each other by non-structured intermediate plates 7. This modular design allows the micro-evaporator to be constructed to have any desired throughput.

The micro-evaporator 1 is sealed at the top by a cover plate 5. The base plate 6 is not shown in this figure. The liquid to be evaporated is supplied and discharged by feed and discharge lines 30 and 31 that are perpendicular to the evaporator plates 10. The heating gas is supplied by the feed line 32, and the heating gas is discharged by the discharge line 33. The cross-sections of individual lines 30 to 33 are adapted to the requirements of the utilized media.

In FIG. 9*b*, one can see the structuring of the heating channels 27 on the bottom of the evaporator plate 10.

Figure 10:
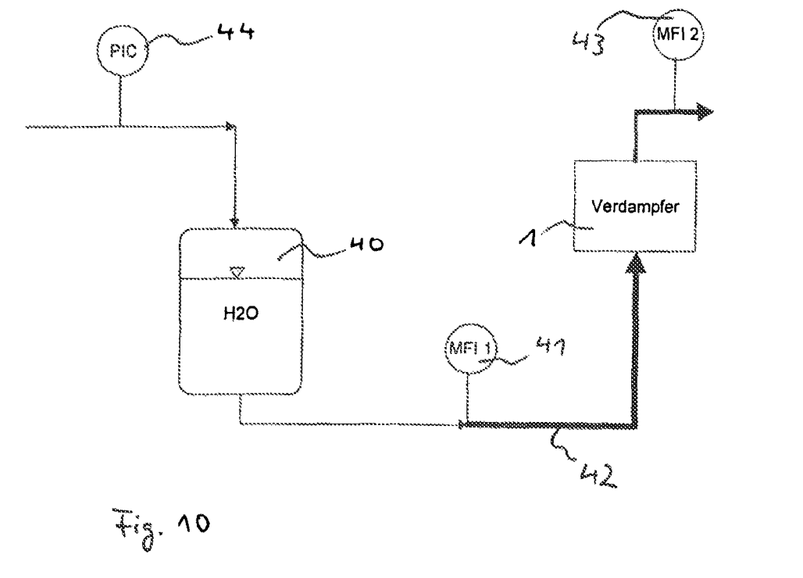

An evaporation system is portrayed in FIG. 10 that uses a micro-evaporator 1. The liquid (water in this instance) was held by a pressurized reservoir 40. The flow of the unevaporated liquid was determined by a thermal mass flow regulator is 41. After evaporation, secondary heaters 42 (indicated by the bold arrows) prevent the liquid from condensing. The quality of the generated vapor was determined with a Coriolis flowmeter 43. The amount of evaporated water can be regulated by the preliminary pressure regulator 44.

REFERENCE NUMBER LIST 1 micro-evaporator
2 heating plate
3 hole
4 heating element
5 cover plate
6 baseplate
7 intermediate plate
8 groove-like recess
10 micro-evaporator plate
11 front
12 inlet
13 liquid feed chamber
14 inlet area
15 trapezoidal area
16 outlet area
17 vapor collection chamber
18 outlet
19 underside
20, and 20', 20" micro-evaporator channel
21, 21', 21" segment
22 channel section with a smaller cross-section
23 channel section with a larger cross-section
24 channel section
25 column-shaped segment
26 antechamber 27 heating channel
28 segment
29 post-chamber
30 feed line for liquid
31 discharge line for vapor
32 feed line for heating gas
33 discharge line for heating gas
40 reservoir
41 mass flow controller
42 secondary heater
43 Coriolis flowcontroller
44 upstream pressure regulator It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A micro-evaporator comprising a housing consisting of a heat-conducting material, in which a liquid feed chamber and a vapor collection chamber are provided, between which adjacent micro-evaporator channels are provided in a plane with cross-sections in the sub-millimeter range and the cross-sections remain the same over their entire length, as well as having means to heat the liquid to be evaporated, wherein the micro-evaporator channels are arranged in a trapezoidal area of the housing when viewed in plan view that has an inlet area ending in the liquid feed chamber with a smaller cross-section, and an outlet area ending in the vapor collection chamber with a larger cross-section.

2. The micro-evaporator according to claim 1, wherein the micro-evaporator channels are arranged in a fan shape in the trapezoidal area.

3. The micro-evaporator according to claim 1, wherein the micro-evaporator channels have a cross-section of 100 µm$^2$ to 0.01 mm$^2$.

4. The micro-evaporator according to claim 3, the micro-evaporator channels have a cross-section of 100 µm$^2$ to 0.005 mm$^2$.

5. The micro-evaporator according to claim 4, wherein the micro-evaporator channels have a cross-section of 100 µm$^2$ to 0.0025 mm$^2$.

6. The micro-evaporator according to claim 1, wherein the micro-evaporator channels have a straight-line course.

7. The micro-evaporator according to claim 1 wherein the vapor collection chamber has a larger volume than the liquid feed chamber.

8. The micro-evaporator according to claim 1 wherein the means to heat are located at least in the area below and/or above the micro-evaporator channels.

9. The micro-evaporator according to claim 1, wherein the means to heat are micro-structured heating channels.

10. The micro-evaporator according to claim 1, comprising at least one evaporator plate having on its front side the structure of a liquid supply chamber, the micro-evaporator channels and vapor collection chamber.

11. The micro-evaporator according to claim 10, wherein the evaporator plate has micro-structured heating channels on its back side.

12. The micro-evaporator according to claim 11, wherein cross-sections of the heating channels are 0.1 mm to 10 mm.

13. The micro-evaporator according to claim 11 wherein the heating channels are coated with a catalyst material.

14. The micro-evaporator according to claim 11 wherein the heating channels are parallel.

15. The micro-evaporator according to claim 11, wherein alignment of the heating channels corresponds to alignment of the micro-evaporator channels.

* * * * *

UNITED STATES PATENT AND TRADEMARK OFFICE
CERTIFICATE OF CORRECTION

| | | |
|---|---|---|
| PATENT NO. | : 8,167,030 B2 | |
| APPLICATION NO. | : 11/918172 | |
| DATED | : May 1, 2012 | |
| INVENTOR(S) | : Gunther Kolb et al. | |

It is certified that error appears in the above-identified patent and that said Letters Patent is hereby corrected as shown below:

ON THE TITLE PAGE

Item [73] Assignee: add the Assignee Name as follows:

Institut Für Mikrotechnik Mainz GmbH, Mainz, Germany

Signed and Sealed this
Seventeenth Day of December, 2013

Margaret A. Focarino
*Commissioner for Patents of the United States Patent and Trademark Office*